Feb. 9, 1943.    M. MAGES    2,310,588
AUDIOMETER
Filed Jan. 26, 1942    2 Sheets-Sheet 2
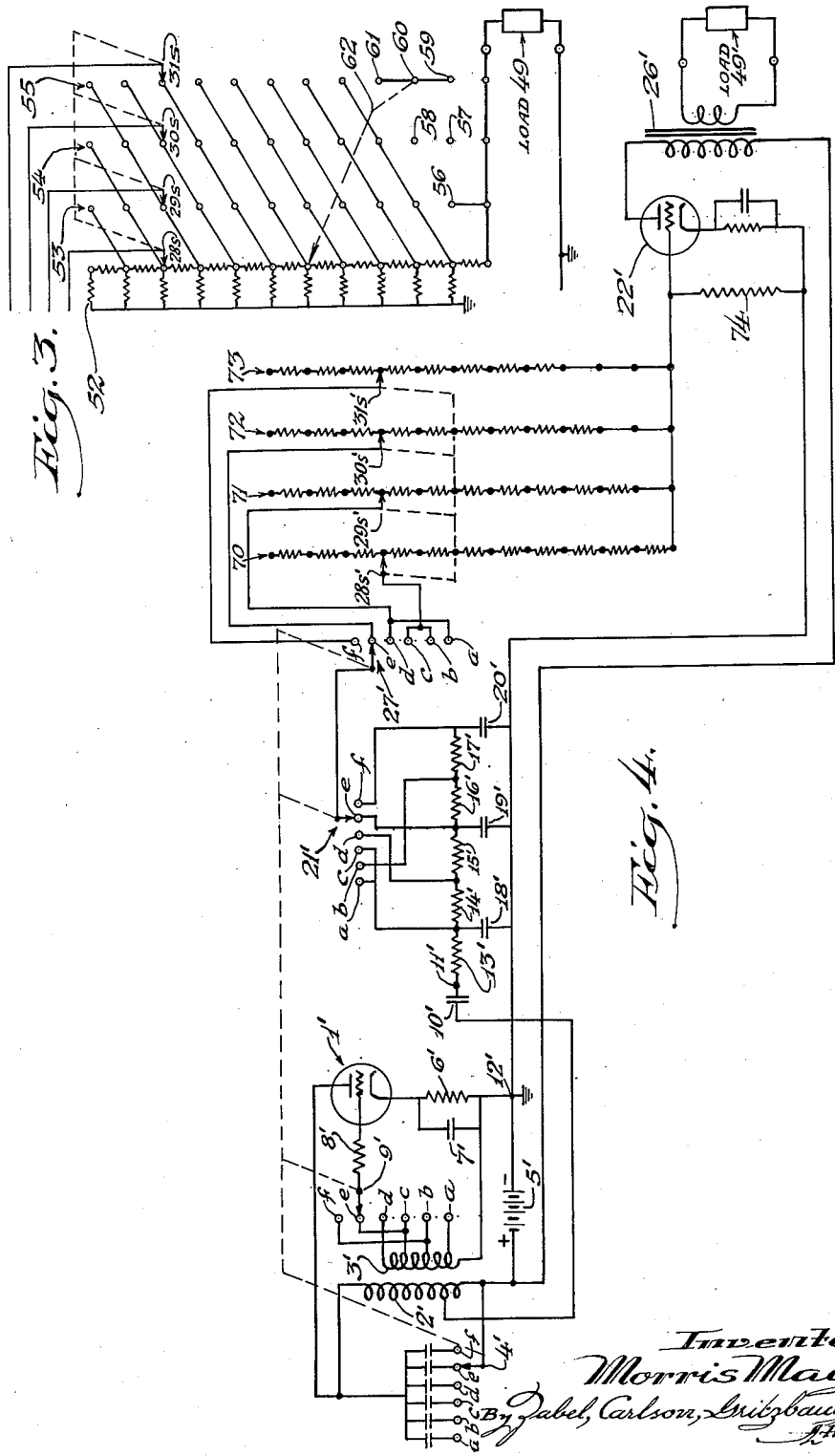
Inventor:
Morris Mages
By Zabel, Carlson, Gritzbaugh & Wells
Attorneys.

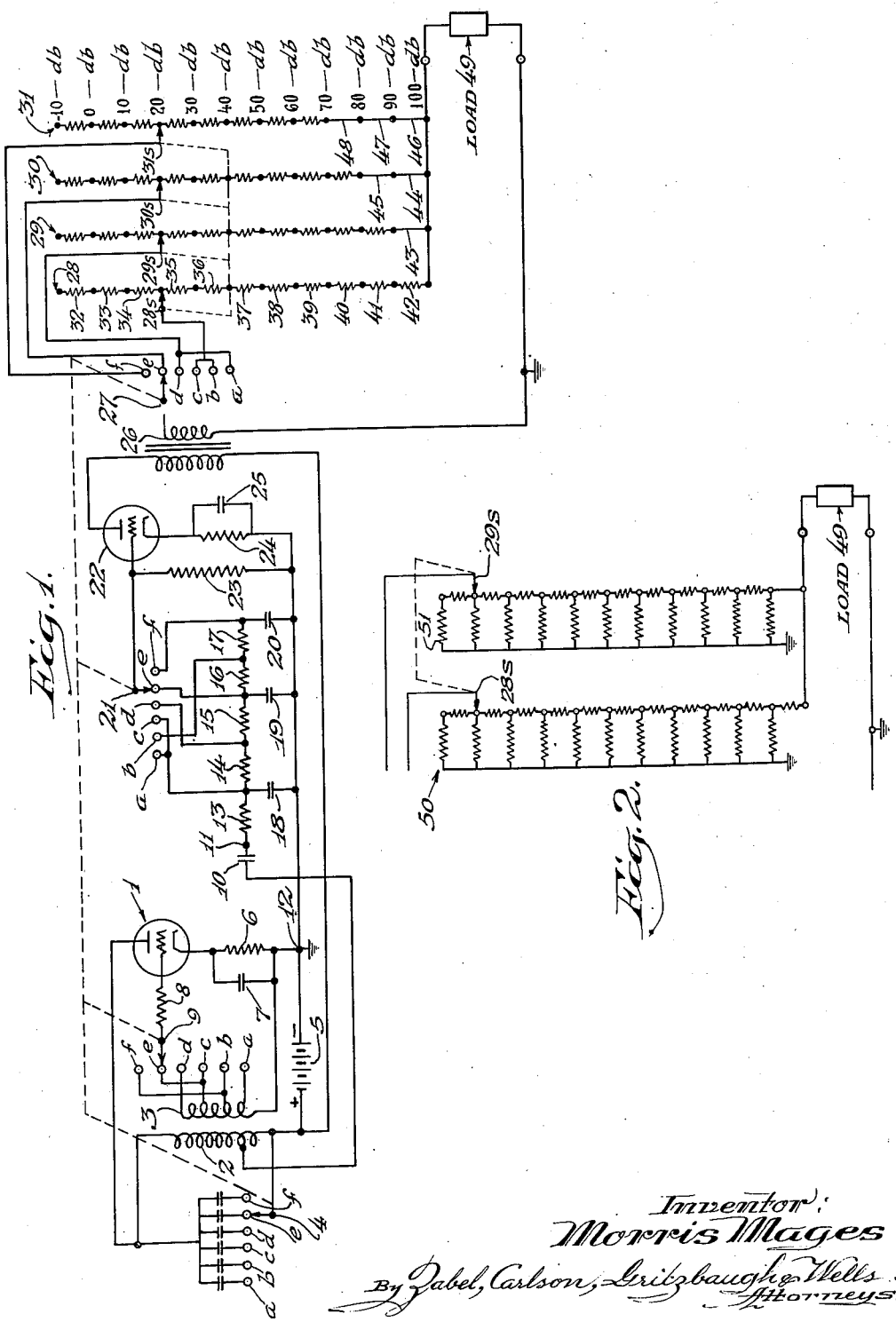

Patented Feb. 9, 1943

2,310,588

UNITED STATES PATENT OFFICE 2,310,588

AUDIOMETER

Morris Mages, Chicago, Ill., assignor to V. Mueller & Company, Chicago, Ill., a corporation of Illinois Application January 26, 1942, Serial No. 428,325

7 Claims. (Cl. 179—1)

The present invention relates to audiometers and particularly to an attenuation system for audiometers. The main object of my invention is to provide an attenuation system whereby the voltage output of a signal generator is made to produce a sound output, which, for any calibrated setting of the attenuator dial, conforms with the true hearing curve of a normal ear as the frequency is varied.

Another important object is to provide an attenuation system wherein the range of attenuation for any selected frequency is automatically limited by the attenuation dial.

The desired function of an audiometer is to provide means whereby the various generated tones or frequencies are attenuable through a desired range of intensity or loudness. A standard range of loudness power for each frequency used has been set up by the American Medical Association Committee of Physical Therapy as the minimum requirement for acceptable audiometers. This standard range is evidently that considered adequate for proper testing of hearing. Because the normal ear is much more sensitive to sound at certain frequencies (for example 1000 cycles) than to sound at other frequencies (such as 128 cycles) it is obvious that more power is necessary to produce a tone of 100 decibels above the normal hearing threshold for the latter frequencies than is necessary to produce a tone of 100 decibels above the normal hearing threshold for the first named frequencies. If the power level is allowed to become too high for the actual sound producing or output device, blasting and distortion take place so as to prevent a true test. Also, the overloading of the output tube that feeds the output device results in severe distortion of wave form in the signal fed to the output device.

My invention contemplates the provision of a calibrating means including a filter network and an oscillation feed back circuit, capable of causing the signal generator to deliver to a range controlling circuit the requisite voltage level to produce a sound output in the output device at the selected frequency which conforms with the hearing threshold of a normal ear for that frequency. Further the invention contemplates the provision of additional means whereby the loudness range for any selected frequency is restricted upon the selection of that frequency to one which can be handled adequately by the output tube and sound producing device of the audiometer and still provide an adequate range for proper testing of hearing. It is not sufficient to simply limit the loudness range for a given frequency but this limited range is obtained in a manner which does not require the circuit components to be subjected to a higher range than the portion actually used.

The present invention also contemplates an attenuator system wherein the limited ranges for the selected frequencies are so arranged that a single calibration point of loudness level for one range and frequency holds for all of the ranges and frequencies selected except where the limiting effect of the ranges enters. Thus a single scale of attenuation is all that is necessary.

The novel system of attenuation which embodies the foregoing combinations and attains the resulting advantages in the operation of an audiometer will be described more fully in the following detailed description, reference being hereby made to the accompanying drawings wherein certain preferred embodiments are shown.

In the drawings:

Fig. 1 discloses diagrammatically a particular embodiment of the invention. In this figure the loudness level selecting means and the range limiting means are interposed between an output tube and a sound producing device such as an earphone unit;

Fig. 2 illustrates a modified arrangement of the individual attenuator sections which may be used in lieu of those shown in Fig. 1;

Fig. 3 illustrates a further modification and simplification of the attenuator parts that may be used in place of those shown in Fig. 1; and Fig. 4 is a diagrammatic showing similar to Fig. 1 but in this form the loudness level selecting means and range limiting means are interposed on the input side of the output tube.

While in the drawings the modifications of Figs. 2 and 3 indicate that they are capable of substitution in the general assembly of Fig. 1 it should be noted that the attenuator sections of Figs. 2 and 3 may be substituted in the general assembly of Fig. 4. A very desirable system is obtained by using the attenuator sections of Fig. 3 in the general assembly of Fig. 4.

Referring to Fig. 1, 1 denotes a triode tube connected as a tuned plate oscillator in which 2 is the plate coil, 3 is the grid coil coupled inductively to the plate coil and having taps arranged for obtaining stable oscillation and for varying the output voltage of the oscillator at the particular frequency or test tone selected by the setting of the switch 4. The points $a, b, c, d, e$ and $f$ on the switch 4 represent six selected frequencies determined by the capacities connected to the various said points. A battery or source of voltage 5 furnishes the plate current for the tube 1. A resistor 6 and a condenser 7 operate to furnish a fixed bias. A resistor 8 limits the plate current to a reasonable value by acting as a grid leak. It also makes the adjustment of elements 6 and 7 non-critical.

The circuit diagram of Fig. 1 shows the oscillator tube operating at a selected frequency e as shown by the position of the switch 4. The output is available between points 11 and 12 through a blocking condenser 10 and at various points of the filter network composed of resistors 13, 14, 15, 16, 17 and by-pass condensers 18, 19, 20. Various points on this filter network are selected by a switch 21 for the various frequencies involved. The arm of the switch 21 connects to the grid of an output tube 22 having a grid leak resistor 23. Cathode bias voltage is obtained through a resistance 24 and a condenser 25. An output transformer 26 couples the output tube to the attenuator system proper which is composed of four main attenuator sections 28, 29, 30 and 31 and four switch contacts 28s, 29s, 30s and 31s mechanically ganged together. Each main section is made up of a number of resistors in series shown as 32, 33, 34, 35, 36, 37, 38, 39, 40, 41 and 42. It will be noted that the main attenuator sections differ from each other in that one or more resistors are omitted in the last few steps, and where the resistors are omitted, connection is made directly to an output device 49. These differences are indicated by the leads 43, 44, 45, 46, 47 and 48.

The source of signal voltage may be transferred to any of the attenuator sections by means of a switch 27. The switches 4, 9, 21 and 27 are ganged together and designated as the frequency selector switch.

Fig. 2 shows a variation of the attenuator system of Fig. 1. Each of the attenuators 28, 29, 30 or 31 may be replaced by a ladder attenuation network such as 50 or 51. Note that these ladder attenuators also differ by the omission of a resistor.

Fig. 3 shows a further modification in which each attenuator section 53, 54 and 55 has a portion in common with the section 52. The end positions 56, 57, 58, 59, 60 and 61 may be connected as shown. That is, the end position 56 may be shorted directly on to the lead to the output device, the end positions 57 and 58 may have no shorting connections, and the end position points 59, 60 and 61 may be connected to a desired point on the section 52 as shown by the lead 62. It is evident that either of the foregoing connections may be used for all or any one of the attenuator sections 53, 54 and 55, depending upon the desired results.

Fig. 4 shows the application of the attenuator system to the grid side of the output tube. In this case the individual attenuators work in conjunction with a grid return resistor 74 which forms a common load. The same switches as in Fig. 1 are mechanically ganged.

Referring again to Fig. 1, assume that the attenuator system is being adjusted for a desired frequency e. The switch 4 will determine the frequency, the switch 9 in conjunction with the switch 21 will determine the amplitude and wave form of the test tone as applied to the grid of the output tube 22. The switch 27 selects the decibel range through which the test tone will operate. The attenuator sections, being mechanically ganged, and uniquely connected in the manner shown, assure a single attenuation calibration for all frequencies.

The operation of the main attenuator sections is as follows: If a test frequency such as e is connected to the arm of an attenuator section 30 as shown, the maximum sound output from the earphone 49 will be produced when the arm of the main attenuator section 30 is at the point calibrated as 100 db. For the 90 db. point the sound output remains the same, as is also the case for the 80 db. calibration point. However, for the remaining positions the calibration is accurate as the resistance portion of the attenuator comes into effect. In this particular case the test tone e would have a range of 80 db. In the same way any test frequency connected to the attenuator 31 would have a range of 70 db. above predetermined threshold level. Attenuation as shown can be carried down to −10 db.; that is, 10 db. below the hearing threshold of a normal ear. The number of ranges desired determines the number of attenuators necessary.

By the above system the output tube and the output device 49 are required to handle only the range of intensity which they are capable of handling for a given frequency. Blasting and distortion in the output device is avoided as is overloading of the output tube.

Another apparent advantage arises from the fact that the signal output of the generator is kept to a lower level than would be required if the method of attenuation necessitated generation of a 100 db. range for every frequency. With the actual output needed cut down, greater leeway is allowed for purification of wave form by the filter network.

The number of ranges used will, in general, be less than the number of test tones generated. For example, the contacts of switch 27 show test tones a and d as having a common db. range, and test tones b and c as having a common range. Inasmuch as the characteristics of the output device and other components of the circuit do not conform with the hearing response of the ear to variation of frequency, some adjustment has to be made for each test tone to make the sound output of the earphone correspond to the calibration of the attenuator dial. This is most easily accomplished by setting the attenuator dial at 0 db. and selecting a tap on switch 9 and a point on the filter network by means of switch 21 which will give a tone of the required purity of wave form at an intensity which is barely audible to a normal ear.

It will be noted that in most cases there will be more than one contact point of switch 21 which will connect to a common point on the filter network. This is illustrated by contacts a and c on switch 21.

Referring to Fig. 2, a modification of the structure of the individual attenuator sections is shown which results in a low constant impedance network for each attenuator. This is desirable to keep the resistors involved to a low value of resistance and to reduce the number of resistance values required.

In Fig. 3 is shown a desirable arrangement of the individual attenuator sections as it gives the greatest flexibility of control combined with a minimum number of resistors. The flexibility of the attenuator system is illustrated by the fact that after the effective maximum step of a range has been reached the test tone can either be continued at exactly the same level for the remaining steps of the calibration or it may be cut off entirely above the desired range. It probably is more desirable to cut off the test tone completely above the effective range in order to avoid false recording in a hearing test. The cut-off feature can be obtained by omitting the connecting wires 56 to 61, inclusive.

It is also possible to arrange the points on one of the attenuator sections such as 55 to give an altered or special sequence of attenuation. This is indicated for one point by the connection 62.

The operation of the attenuator system shown in Fig. 4 is essentially the same as for Fig. 1. It will be noted that there is no point of zero energy level on the attenuator as the level is determined by the switch arms and the amount of attenuation between the switch arms and the load represented by the input resistance of the output tube. Attenuation can be infinite only if an infinite number of resistance steps are used.

From the description given above it is evident that my invention constitutes a desirable method of providing an attenuation control between a source of signal voltage and a load device, this control having a single compensated calibration throughout a frequency range and limiting the maximum output of certain frequencies to effective ranges as desired.

Having thus described my invention, what I claim as new and desire to secure by Letters Patent is:

1. An audiometer operable to produce tones of different frequencies at various sound levels with respect to the hearing threshold level of the normal human ear and to indicate the sound level for the various frequencies upon a single indicator scale, said audiometer comprising, in combination, a source of signal voltage adjusted to give a desired frequency versus output characteristic, an attenuator comprising a plurality of main attenuator sections composed of resistances and contact means and mechanically ganged together whereby to give a single calibrated control, each of said main attenuator sections having an effective attenuation range differing from that of other sections but having common points of energy level simultaneously connectable to corresponding ones of said contact means, means for selectively connecting the source of signal voltage to the contact means of said main attenuation sections operable to selectively limit the range of attenuation of any frequency, and tone producing means non-selectively coupled to the output of the attenuator sections.

2. In an audiometer, an electronic oscillator, a sound producing device operable to produce tones of frequencies corresponding to the frequencies of electrical energy fed to it, a range controlling means having its output non-selectively coupled to the sound producing device, said means being operable to effect limitation, in response to manual adjustment, of the intensity of signal delivered to said sound producing device between a predetermined low level bearing a definite ratio to the hearing threshold of a normal ear and a predetermined high level for any of a number of selected frequencies, operating means for said range controlling means operating to selectively limit the maximum intensity and range for any preselected frequencies, and means including an oscillation feed back circuit and a filter network receiving energy from said oscillator and under common control for effecting variation of the frequency and a corresponding correction of intensity of signal delivered by said oscillator to the range controlling means.

3. In an audiometer an attenuator system insertable between a source of signal voltage and a load circuit which effects translation of the electrical signals from said source into sound tones, said attenuator system comprising different resistance units providing attenuation ranges all having a common coupling to the load circuit, and a selector operable to connect any one of the said attenuation ranges to the source of signals, connecting means mechanically ganged together and interposed between the selector and said ranges to vary the amount of resistance in circuit whereby to effect variations in intensity of signal delivered to the load device, each of said attenuation ranges having a different total value of resistance but all of said units having a common section.

4. In combination, a source of signal voltage adjusted to have a desired frequency versus output characteristic, an attenuator consisting of a plurality of main attenuator sections mechanically ganged together to give a single calibrated control, each of said main attenuator sections having an effective attenuation range differing from that of the other sections but having a fixed relationship of its maximum and intermediate points to that of the other sections, and a fixed relationship between corresponding points of energy levels, means for selectively connecting the source of signal voltage to any of the main attenuation sections, means common to all sections for changing the connection of the signal source to any of the intermediate points of an attenuator section so selected, and means coupling the load non-selectively to the output of the attenuator sections.

5. In an audiometer, the combination with a source of audio frequency signal energy comprising an electronic oscillator which is adjustable as to operating frequency and a sound producing device operable to produce tones of the frequency delivered by said signal energy source, of means operable to effect delivery of the signal energy from said source to the sound producing device at desired loudness levels above predetermined levels selected as the hearing threshold levels of the normal ear for various selected frequencies, said means including selectable circuits operable to cause said source to produce the operating frequency desired, filter networks for said frequencies connected to the output of said oscillator, control means operable to effect the selection of the desired frequency control circuit and to connect the corresponding filter network in circuit, attenuator resistances selectable by said control means to correspond to the filter network and operable to effect a loudness level limitation of the delivery of signal to said sound producing device to the predetermined level selected for that frequency, means individual to the resistances to vary the amount of the selected resistance in circuit, a common indicator for the several resistances graduated in tone loudness measurements, and means operable to effect movement of all said individual means and said indicator together to effect the indicated changes in tone loudness regardless of which particular frequency is selected.

6. In an audiometer, an electronic oscillator, a sound producing device operable to produce tones of frequencies corresponding to the frequencies of electrical energy fed to it, a range controlling means having its output non-selectively coupled to the sound producing device, said means being operable to effect limitation, in response to manual adjustment, of the intensity of signal delivered to said sound producing device between a predetermined low level bearing a definite ratio to the hearing threshold of a normal ear and a predetermined high level for any of a number of selected frequencies, means including an oscillation frequency control, a feedback control, and a filter network receiving energy from said oscillator, said frequency, feedback and filtering controls cooperating under common control to effect variation of the frequency and wave form of the signal source and provide a desired correction of intensity of signal delivered by said oscillator to the range controlling means.

7. An audiometer operable to produce tones of different frequencies at various sound levels with respect to the hearing threshold level of the normal human ear and to indicate the sound level for the various frequencies upon a single indicator scale, said audiometer comprising, in combination, a source of signal voltage adjusted to give a desired frequency versus output characteristic, an attenuator comprising a plurality of main attenuator sections having contact means mechanically ganged together whereby to give a single calibrated control, at least one of said attenuator sections being composed of resistances arranged to form an attenuation network, and certain of the remaining sections utilizing a portion of said resistances in common, each of said main attenuator sections having an effective attenuation range differing from that of other sections but having common points of energy level simultaneously connectable to corresponding ones of said contact means, means for selectively connecting the source of signal voltage to the contact means of said main attenuation sections and tone producing means non-selectively coupled to the output of the attenuator sections.

MORRIS MAGES.